US008015646B2

(12) United States Patent
Lee et al.

(10) Patent No.: US 8,015,646 B2
(45) Date of Patent: Sep. 13, 2011

(54) LAUNDRY TREATING DEVICE AND METHOD OF CONTROLLING THE SAME

(75) Inventors: Dong Soo Lee, Seoul (KR); Ki Chul Woo, Seoul (KR); Na Eun Kim, Seoul (KR); Dong Won Kim, Seoul (KR); Sung Min Kim, Seoul (KR); Sung Ryong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 12/252,960

(22) Filed: Oct. 16, 2008

(65) Prior Publication Data

US 2009/0133197 A1    May 28, 2009

(30) Foreign Application Priority Data

Nov. 27, 2007    (KR) .................. 10-2007-0121646

(51) Int. Cl.
*D06F 25/00*    (2006.01)
(52) U.S. Cl. .................. 8/158; 68/3 R; 68/20
(58) Field of Classification Search .............. 68/3 R, 68/19.1, 15, 207
See application file for complete search history.

(56) References Cited

U.S. PATENT DOCUMENTS

| 2,566,488 | A | * | 9/1951 | Gould | 68/20 |
| 3,555,701 | A | * | 1/1971 | Hubbard | 34/602 |
| 3,587,293 | A | * | 6/1971 | Bowers | 374/16 |
| 4,083,118 | A | * | 4/1978 | Cotton | 34/562 |
| 4,187,701 | A | * | 2/1980 | Wendel | 68/20 |
| 5,385,037 | A | | 1/1995 | Bae | |
| 2008/0022465 | A1 | * | 1/2008 | Jun et al. | 8/158 |

FOREIGN PATENT DOCUMENTS

| CN | 16009393 | * | 3/2005 |
| EP | 1 605 090 | | 12/2005 |
| EP | 1 882 768 | | 1/2008 |
| GB | 2 236 334 | * | 4/1991 |
| JP | 63-127788 | * | 5/1988 |
| JP | 2-128792 | | 5/1990 |
| JP | 03-291455 | * | 12/1991 |
| JP | 05-248649 | * | 9/1993 |
| JP | 08-257297 | * | 10/1996 |
| JP | 9-313771 | | 12/1997 |
| JP | 2002048525 | * | 6/2002 |
| KR | 10-2001-0093876 | | 10/2001 |
| KR | 10-2004-0006683 | | 1/2004 |
| RU | 2291238 | | 1/2007 |
| RU | 2005132513 | | 4/2007 |
| UA | 57799 | | 7/2003 |
| UA | 65749 | | 4/2004 |
| WO | WO 2006/103700 | | 10/2006 |

OTHER PUBLICATIONS

European Patent Office 0 452 678 Oct. 1991.*
European Search Report dated Mar. 30, 2009.
International Search Report and Written Opinion issued in PCT/KR2008/006750 dated Jun. 1, 2010.

(Continued)

*Primary Examiner* — Frankie L Stinson
(74) *Attorney, Agent, or Firm* — KED & Associates, LLP

(57) ABSTRACT

A laundry treating device includes a first laundry treating device and a second laundry treating device adjacent to the first laundry treating device. A first heater provided in the first laundry treating device and a second heater provided in the second laundry treating device can be selectively and alternatively operated to heat washing water.

12 Claims, 5 Drawing Sheets

OTHER PUBLICATIONS

Decision on Grant issued in Russian Application No. 2010126169 dated Nov. 1, 2010 (full Russian text and full English translation).

Notice of Allowance issued in UA Application No. 201007870 dated Mar. 1, 2011.

* cited by examiner

FIG. 3

| Operation Mode(P) | Operation Order |
|---|---|
| $P_1$ | Mif → Sif |
| $P_2$ | Mi → Sif → Mf |
| $P_3$ | Mi → Si → Mf → Sf |
| $P_4$ | Mi → Si → M → Sf → Mf |
| $P_5$ | Sif → Mif |
| $P_6$ | Si → Mif → Sf |
| $P_7$ | Si → Mi → Sf → Mf |
| $P_8$ | Si → Mi → S → Mf → Sf |

FIG. 4

| Operation Mode(Q) | | Operation Order |
|---|---|---|
| $Q_1$ | Mi | Ms → Sif → Mf |
| $Q_2$ | Mi | Ms → Si → M → Sf → Mf |
| $Q_3$ | Mi | Ms → Si → Mf → Sf |
| $Q_4$ | Mi | Mf → Sif |
| $Q_5$ | Mi | M → Sif → Mf |
| $Q_6$ | Mi | M → Si → Mf → Sf |
| $Q_7$ | Mi | M → Si → M → Sf → Mf |
| $Q_8$ | Si | Ss → Mif → Sf |
| $Q_9$ | Si | Ss → Mi → S → Mf → Sf |
| $Q_{10}$ | Si | Ss → Mi → Sf → Mf |
| $Q_{11}$ | Si | Sf → Mif |
| $Q_{12}$ | Si | S → Mif → Sf |
| $Q_{13}$ | Si | S → Mi → Sf → Mf |
| $Q_{14}$ | Si | S → Mi → S → Mf → Sf |

LAUNDRY TREATING DEVICE AND METHOD OF CONTROLLING THE SAME

BACKGROUND

1. Field

The present disclosure relates to a laundry treating device capable of washing and/or drying laundry, and a method of controlling the same.

2. Background

A washing machine performs washing, rinsing, and spin-drying operations, in order to remove contaminants attached to laundry using the interaction of detergent and water. A dryer, which is another representative laundry treating device, is a home appliance for drying wet clothes, etc. Recently, a home appliance having a combined function of a washing machine and a drying machine has widely been used.

Generally, such laundry treating devices are classified into a top loading type and a front loading type in accordance with the laundry loading position. Typically, a laundry treating device is directly installed on a wood, cement, or tile floor. In this connection, in the case of a front loading type laundry treating device, it is inconvenient for the user to load and unload laundry because the position of the loading/unloading opening of the device is low.

Generally, only one large-capacity washing machine is installed in a home. When one wants to wash different kinds of laundry in an independent manner, using the washing machine, it is necessary to operate the washing machine several times. For example, when one wants to wash laundry such as adult clothes and laundry such as underclothes or baby clothes in an independent manner, the washing machine operates two times to individually wash the two different kinds of laundry. For this reason, the washing time increases, and the consumption of energy also increases.

Furthermore, it is undesirable to use a large-capacity washing machine to wash a small amount of laundry, in terms of saving energy. Generally, users collect laundry for several days, in order to wash the collected laundry at one time. However, leaving laundry, in particular, underclothes or baby clothes, without immediately washing them, is undesirable in terms of cleanliness. Furthermore, when such clothes are left for a long period of time, there is a problem in that they cannot be cleanly washed because dirt may be fixed to the clothes.

Moreover, the washing course set in a large-capacity washing machine consumes a large amount of water, even when only a small amount of laundry is washed. Also, a large amount of electricity is consumed because it is necessary to rotate a large-size drum or pulsator. Also, the washing course set in a large-capacity washing machine is typical for general clothes. For this reason, the large-capacity washing machine may be unsuitable for the washing of delicate clothes such as underclothes or baby clothes.

In this regard, the necessity of a small-size washing machine having a capacity much smaller than the conventional large-capacity washing machine has increased. However, where two small-size washing machines are equipped in a home, there are problems associated with space utility and beauty, even though the size of the washing machines is small.

BRIEF DESCRIPTION OF THE DRAWINGS

Embodiments will be described in detail with reference to the following drawings in which like reference numerals refer to like elements, and wherein:

FIG. 3 is a table illustrating an exemplary embodiment of a method of controlling the laundry treating device;

FIG. 4 is a table illustrating another embodiment of a laundry treating device control method.

DETAILED DESCRIPTION

Figure 1:
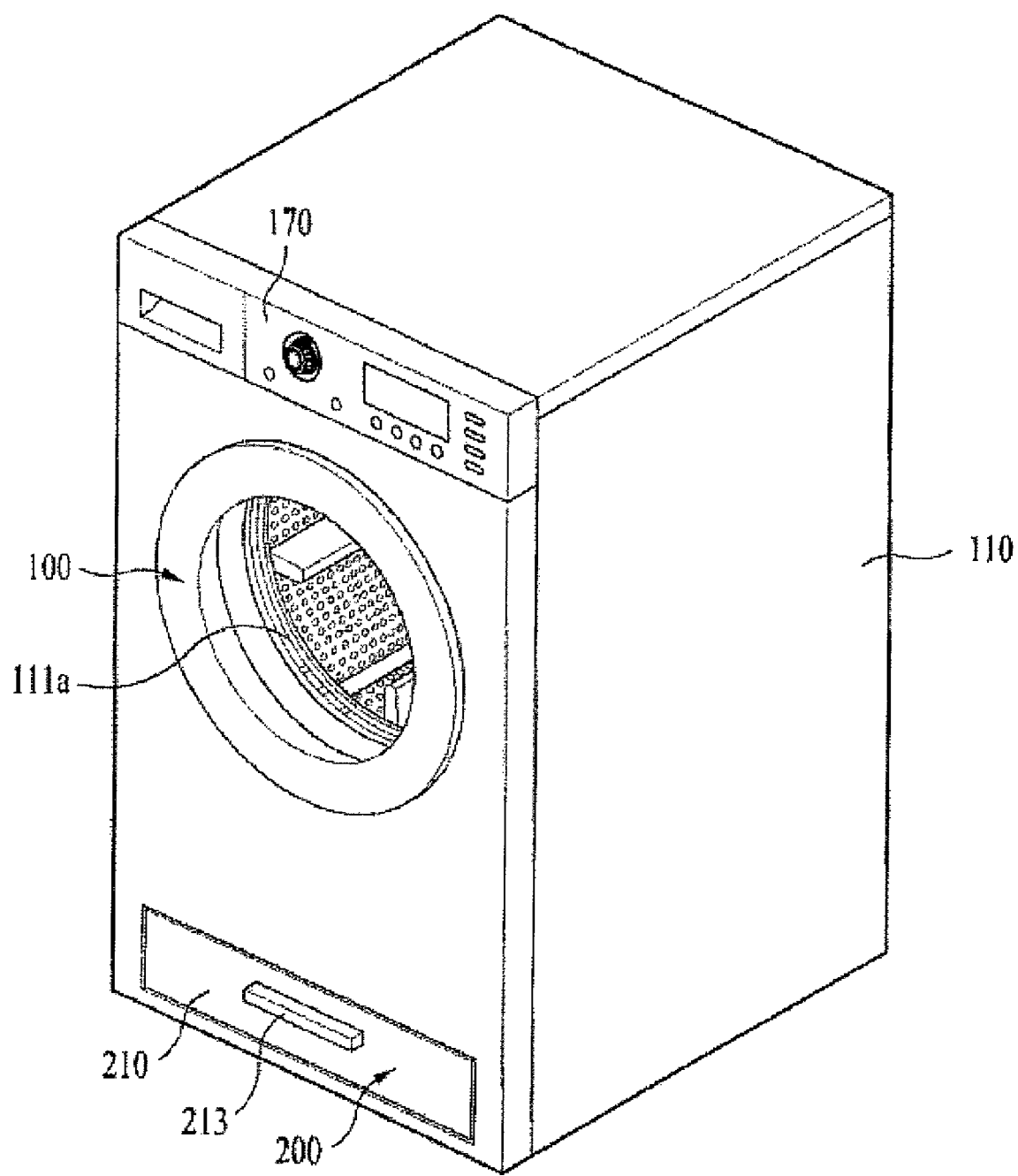
FIG. 1 is a perspective view illustrating an exemplary embodiment of a laundry treating device.
Figure 2:
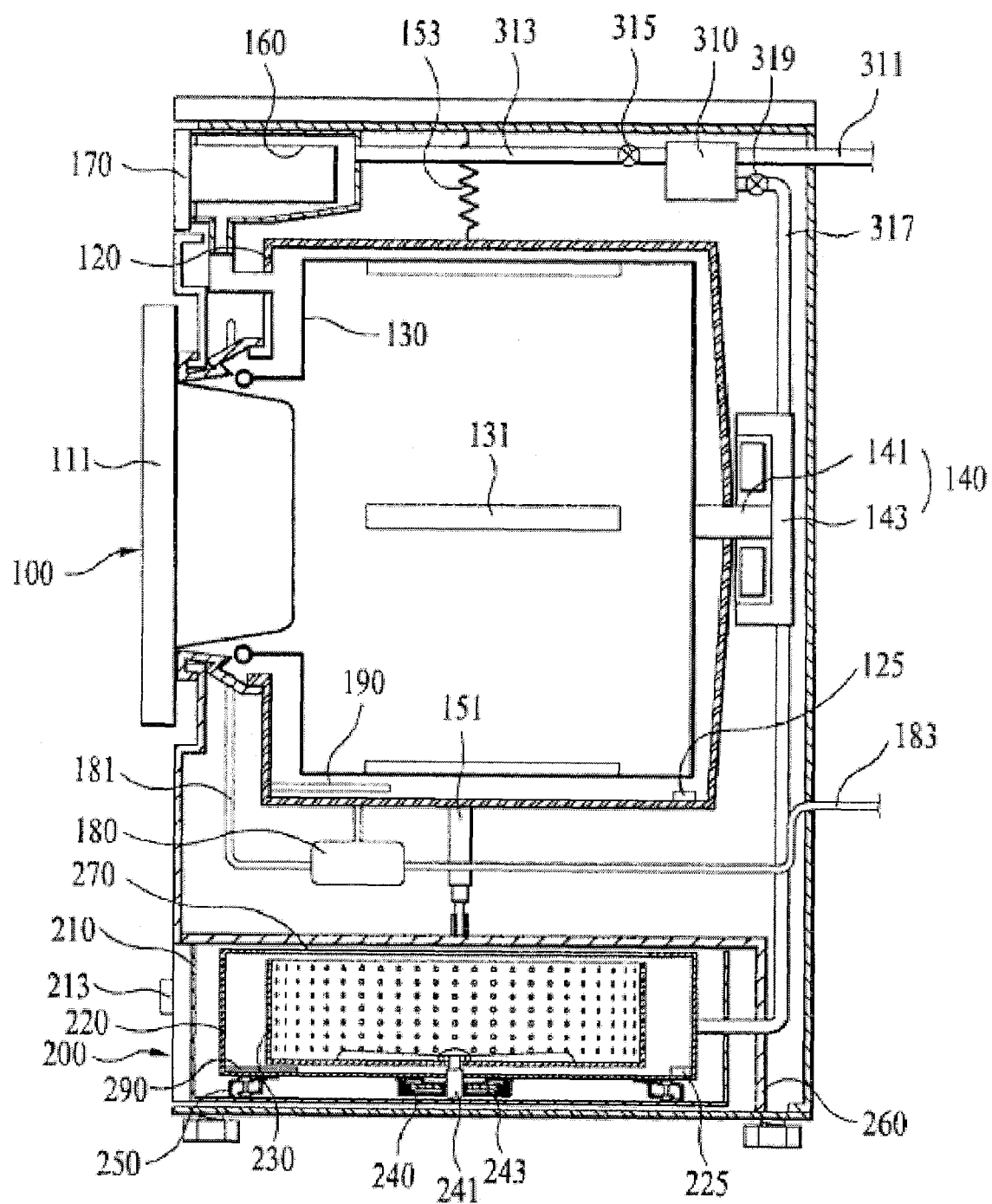
FIG. 2 is a side sectional view of the device shown in FIG. 1.

An exemplary embodiment of a laundry treating device will be described with reference to FIGS. 1 and 2. The laundry treating device includes a cabinet 110 constituting an outer structure of the laundry treating device. A first laundry treating device 100 is installed in the cabinet 110, and a second laundry treating device 200 is installed in the cabinet 110 in the vicinity of the first laundry treating device 100. The second laundry treating device 200 can operate independently of the first laundry treating device 100.

A control panel 170 is arranged at the front side of the cabinet 110, to control the first and second laundry treating devices. At the front side of the cabinet 110, a first door 111 is included as part of the first laundry treating device 100 and a front wall of a case 210 forms a part of the second laundry treating device 200.

The first laundry treating device 100 includes a first washing tub 120, a first drum 130 rotatably installed in the first washing tub 120, and a first driver 140 to drive the first drum 130. The first door 111, which is also included in the first laundry treating device 100, functions to open or close the first drum 130.

The top of the first washing tub 120 is connected to the cabinet 110 by a suspension unit 153. The bottom of the first washing tub 120 is connected to a mover housing 260 by a first damper 151. Of course, the first washing tub 120 may be formed integrally with the cabinet 140.

The central rotating axis of the first drum 130 is parallel with the floor. The first drum 130 has an opening 111a open toward the front side of the cabinet 110.

A plurality of lifts, which operate to wash laundry, are arranged on an inner surface of the first drum 130. The lifts 131 raise laundry contained in the first drum 130, and then let the raised laundry fall, to cause frictional force and impact force to be applied to the laundry.

The first driver 140 includes a first drive shaft 141 connected to the first drum 130, and a first motor 143 to rotate the first drive shaft 141. The first driver 140 supports the first washing tub 120 at the rear side of the first washing tub 120, while rotating the first drum 130.

The first door 111 is hinged to the cabinet 110 at the front side of the cabinet 110. The central portion of the first door 111 is configured to allow the user to view the interior of the first drum 130.

The second laundry treating device 200 includes, in addition to the case 210, a second washing tub 220 installed in the case 210, a second drum 230 rotatably installed in the second washing tub 220, a second driver 240 to drive the second drum 230, and a second door 270 to open or close the second drum 230.

The second laundry treating device 200 is received in the mover housing 260, which is arranged beneath the first laundry treating device 100. The second laundry treating device 200 can be slid in forward and rearward directions into and out of the cabinet 110. A handle 213 is provided at the front side of the second laundry treating device 200, to move the second laundry treating device 200. The case 210 can slide along the mover housing 260. The second washing tub 220 is received in the case 210. The second washing tub 220 is coupled to the bottom of the case 210 inside the case 210 by a second damper 250.

The central rotating axis of the second drum 230 is perpendicular to the floor. The second drum 230 has an opening (not shown) formed through the top of the second drum 230. Accordingly, the second door 270 is installed at the top of the second drum 230. Thus, the second laundry treating device 200 is of a top loading type.

The second driver 240 includes a second drive shaft 241 connected to the second drum 230, and a second motor 243 to rotate the second drive shaft 241. The second driver 240 supports the second washing tub 220 at the bottom of the second washing tub 220, while rotating the second drum 230.

The laundry treating device further includes a first heater 190 and a second heater 290 to heat water supplied to the first washing tub 120 and the second washing tub 220, respectively. The first heater 190 is installed in the first washing tub 120, whereas the second heater 290 is installed in the second washing tub 220. In some embodiments, the first and second heaters 190 and 290 operate alternately under the control of a controller. For example, the second heater 290 does not operate during the operation of the first heater 190. Similarly, the first heater 190 does not operate during the operation of the second heater 290.

The laundry treating device further includes a water supply unit to supply water to the laundry treating device. The water supply unit includes an external connecting pipe 311 connected to an external water supply source. A water tank 310 stores water supplied through the external connecting pipe 311. A first water supply pipe 313 guides water from the water tank 310 to the first washing tub 120, and a second water supply pipe 317 guides water from the water tank 310 to the second washing tub 220.

The water supply unit may also include a first water supply control valve 315 arranged in the first water supply pipe 313, to control the amount of water supplied to the first washing tub 120. A second water supply control valve 319 is arranged in the second water supply pipe 317, to control the amount of water supplied to the second washing tub 220.

The first water supply pipe 313 may be connected, at one end thereof, to the water tank 310, and may be connected, at the other end thereof, to a first detergent box 160. As a result, water which is guided through the first water supply pipe 313 is supplied to the first washing tub 120 after passing through the first detergent box 160. Similarly, the second water supply pipe 317 may be connected, at one end thereof, to the water tank 310, and may be connected, at the other end thereof, to a second detergent box (not shown). As a result, water which is guided through the second water supply pipe 317 is supplied to the second washing tub 220 after passing through the second detergent box. Alternatively, a single detergent box may be installed. In this case, either the first water supply pipe 313 or the second water supply pipe 317 is connected, at one end thereof, to the water tank 310, and is connected, at the other end thereof, to the single detergent box. Accordingly, when water is supplied to the first washing tub 120, or when water is supplied to the second washing tub 220, water from the water tank 310 always passes through the detergent box.

One end of each line connected to the water tank may be arranged at a level higher than the other end of the line connected to the first and second washing tubs. In this case, water emerging from the water tank can be naturally introduced into the first and second washing tubs in accordance with the water head difference between the opposite ends of the line, without using a pump.

A first temperature sensor 125 may be arranged in the first washing tub 120, to measure the temperature of water in the first washing tub 120. A second temperature sensor 225 may be arranged in the second washing rub 220, to measure the temperature of water in the second washing tub 220.

A first draining pipe 183 and a first circulating pipe 181 are arranged in the cabinet 110. The first draining pipe 183 functions to outwardly drain water from the first washing tub 120. The first circulating pipe 181 functions to re-introduce, into the first washing tub 120, water discharged from the first washing tub 120.

A first circulating pump 180 is arranged at a branch point of the first draining pipe 183 and first circulating pipe 181, to outwardly drain or circulate water emerging from the first washing tub 120. The water emerging from the first washing tub 120 can be pumped to spray the pumped water back into the first washing tub 120. In accordance with the pumping operation, diverse water flows are generated in the first drum 130, and impact force and frictional force are generated through the water spray. Accordingly, it is possible to achieve an enhancement in washing and rinsing efficiencies.

Similarly, a second draining pipe (not shown) and a second circulating pipe (not shown) are arranged in the cabinet 110. The second draining pipe functions to outwardly drain water from the second washing tub 220. The second circulating pipe functions to re-introduce, into the second washing tub 220, water discharged from the second washing tub 220. A second circulating pump (not shown) may also be installed at a branch point of the second draining pipe and second circulating pipe.

A procedure for supplying water to the washing tubs of the first and second laundry treating devices when the first and second laundry treating devices operate simultaneously will be described with reference to FIG. 3.

After loading laundry into the first and second laundry treating devices, the user may input a command to operate the first and second laundry treating devices. That is, a laundry treating command may be input to the first and second laundry treating devices before the first heater 190 included in the first laundry treating device and the second heater 290 included in the second laundry treating device operate.

The method of controlling the laundry treating device includes a first heating step for driving the first heater, to heat water supplied to the first washing tub, and a second heating step for driving the second heater, which operates independently of the first heater, to heat water supplied to the second washing tub. When the first and second heating steps are selectively executed, the priority order of the first and second heating steps may be determined in accordance with a predetermined control algorithm. The control algorithm may be implemented in various forms. For example, the controller may determine the heater operation order, based on the amount of electricity to be supplied to the first or second heater. Of course, the heater operation order may be determined, based on a predetermined temperature of water to be heated by the first or second heater. Alternatively, the controller may determine the heater operation order in accordance with a user's command. Otherwise, there may be a heater operation order previously stored in the controller.

Each operation mode P shown in FIG. 3 represents an operation order of the first and second heaters when the first and second laundry treating devices 100 and 200 operate simultaneously. In FIG. 3, "M" represents the operation of the first heater of the first laundry treating device, whereas "S" represents the operation of the second heater of the second laundry treating device. The subscript "if" represents the step of initiating the operation of the associated heater, and then continuing the operation of the associated heater until the temperature of water heated by the associated heater reaches a predetermined temperature and the heater is turned off. The subscript "i" represents the initiation of the operation of the associated heater, and the subscript "f" represents the finishing of the operation of the associated heater. A step without any subscript represents a state in which the associated heater is in operation, but the operation is neither the beginning nor the end of the heating operation.

Each of the operation modes P1 to P4 represents an operation mode in which the first heater operates preferentially. On the other hand, each of the operation modes P5 to P8 represents an operation mode where the second heater operates preferentially.

The operation mode P1 represents the procedure of initiating the operation of the first heater, and then continuing the operation of the first heater until the water in the first washing tub is heated to a first predetermined temperature ($M_{if}$), then subsequently initiating the operation of the second heater, and continuing the operation of the second heater until the water in the second washing tub is heated to a second predetermined temperature ($S_{if}$).

The operation mode P2 represents the procedure of initiating the operation of the first heater ($M_i$). Then after a predetermined period of time elapses, stopping the first heater and initiating the operation of the second heater. Operation of the second heater continues until the water in the second washing tub is heated to the second predetermined temperature ($S_{if}$). The second heater is then turned off, and the first heater is turned back on to finish heating the water in the first washing tub to the first predetermined temperature ($M_f$).

In the operation mode P3, the operation of the first heater is preferentially initiated ($M_i$). After a predetermined time elapses, the operation of the first heater is stopped, and the operation of the second heater is initiated ($S_i$). After a predetermined time elapses, the operation of the second heater is stopped, and the operation of the first heater is again executed until the first heater is finished heating the water in the first washing tub to the first predetermined temperature ($M_f$). The operation of the second heater is then again executed until the water in the second washing tub is heated to the second predetermined temperature ($S_f$).

In the operation mode P4, the operation of the first heater is preferentially initiated ($M_i$). After a predetermined time elapses, the operation of the first heater is stopped, and the operation of the second heater is initiated ($S_i$). Subsequently, the operation of the second heater is stopped, and the operation of the first heater is again executed (M). Subsequently, the operation of the first heater is stopped, and the operation of the second heater is again executed until the water in the second washing tub is heated to the second predetermined temperature ($S_f$). The operation of the first heater is then again executed until the water in the first washing tub is heated to the first predetermined temperature ($M_f$).

Meanwhile, the operation modes P5, P6, P7, and P8 are similar to the operation modes P1, P2, P3, and P4, respectively, however, they are reverse to each other in terms of the operation order of the first and second heaters, namely, the order of M and S.

For example, the operation mode P5 represents the procedure of initiating the operation of the second heater, and continuing operation of the second heater until the water in the second washing tub is heated to the second predetermined temperature ($S_{if}$), then subsequently initiating the operation of the first heater, and continuing the operation of the first heater until the water in the first washing tub is heated to the first predetermined temperature ($M_{if}$). Thus, in the operation modes P1 and P5, the first or second heating steps are executed such that one heating step is initiated after the finish of the other heating step. In the operation modes P3 and P4 and operation modes P7 and P8, the first and second heating steps may be alternately executed until the temperature of water supplied to one of the first and second washing tubs reaches the associated predetermined temperature. In each operation mode, the operation times of the first and second heaters may be set to be different from each other.

Hereinafter, a procedure for driving the first and second heaters when one of the first and second laundry treating devices starts to operate during the operation of the other laundry treating device will be described with reference to FIG. 4. In this case, a command to operate one of the laundry treating devices is input at a time that the other laundry treating device is already in operation. In response to the command, the controller may stop or continue the operation of the heater in the laundry treating device which is already in operation.

The operation order of the first and second heaters may be determined in accordance with a predetermined control algorithm. The control algorithm may be implemented in various forms. For example, the controller may determine the heater operation order based on amounts of heat respectively required to heat water supplied to the first and second washing tubs 120 and 220 to associated predetermined temperatures. Alternatively, the controller may determine the heater operation order based on amounts of electricity to be respectively supplied to the first and second heaters. The heater operation order may also be determined in accordance with a user's command. Otherwise, there may be a heater operation order previously stored in the controller.

In FIG. 4, each of the operation modes Q1 to Q7 represents an operation mode in which the second laundry treating device starts to operate while the first laundry treating device is already being operated. On the other hand, each of the operation modes Q8 to Q14 represents an operation mode in which the first laundry treating device starts to operate while the second laundry treating device is already in operation.

Each of the operation modes Q1 to Q3 represents an operation mode in which, when the second laundry treating device starts to operate during the operation of the first laundry treating device, the operation of the first heater of the first laundry treating device is stopped, and the operation of the second heater is initiated.

Each of the operation modes Q4 to Q7 represents an operation mode in which, even when the second laundry treating device starts to operate during the operation of the first laundry treating device, the operation of the first heater of the first laundry treating device is continued.

In detail, in the operation mode Q1, when the second laundry treating device starts to operate during the operation of the first heater ($M_i$), the operation of the first heater is stopped ($M_s$). Subsequently, die operation of the second heater is initiated, and it continues until the water in the second washing tub is heated to the second predetermined temperature ($S_{if}$). Thereafter, the operation of the first heater is again executed until the water in the first washing tub is heated to the first predetermined temperature ($M_f$).

In the operation mode Q2, when the second laundry treating device starts to operate during the operation of the first heater ($M_i$), the operation of the first heater is stopped ($M_s$). Subsequently, the operation of the second heater is initiated ($S_i$). The operation of the second heater is continued for a predetermined time, and then stopped. At this time, the operation of the first heater is again executed (M). Subsequently, the operation of the first heater is temporarily stopped. At this time, the operation of the second heater is again executed until the water in the second washing tub is heated to the second predetermined temperature ($S_f$). Thereafter, the operation of the first heater is again executed until the water in the first washing tub is heated to the first predetermined temperature ($M_f$).

In the operation mode Q3, when the second laundry treating device starts to operate during the operation of the first heater ($M_i$), the operation of the first heater is stopped ($M_s$). Subsequently, the operation of the second heater is initiated ($S_i$). The operation of the second heater is continued for a predetermined time, and then stopped. At this time, the operation of the first heater is again executed until the water in the first washing tub is heated to the first predetermined temperature ($M_f$). Subsequently, the operation of the second heater is again executed until the water in the second washing tub is heated to the second predetermined temperature ($S_f$).

In the operation mode Q4, when the second laundry treating device starts to operate during the operation of the first heater ($M_i$), the operation of the first heater is continued until the water in the first washing tub is heated to the first predetermined temperature ($M_f$). Subsequently, the operation of the second heater is initiated and continued until the water in the second washing tub is heated to the second predetermined temperature ($S_{if}$).

In the operation mode Q5, when the second laundry treating device starts to operate during the operation of the first heater ($M_i$), the operation of the first heater is continued without being stopped (M). The operation of the first heater is stopped after a predetermined time elapses. Subsequently, the operation of the second heater is initiated and continues until the water in the second washing tub is heated to the second predetermined temperature ($S_{if}$). Thereafter, the operation of the first heater is again executed until the water in the first washing tub is heated to the first predetermined temperature ($M_f$).

In the operation mode Q6, when the second laundry treating device starts to operate during the operation of the first heater ($M_i$), the operation of the first heater is continued without being stopped (M). The operation of the first heater is stopped after a predetermined time elapses. Subsequently, the operation of the second heater is initiated ($S_i$). The operation of the second heater is continued for a predetermined time, and then stopped. At this time, the operation of the first heater is again executed until the water in the first washing tub is heated to the first predetermined temperature ($M_f$). Subsequently, the operation of the second heater is again executed until the water in the second washing tub is heated to the second predetermined temperature ($S_f$).

In the operation mode Q7, when the second laundry treating device starts to operate during the operation of the first heater ($M_i$), the operation of the first heater is continued without being stopped (M). The operation of the first heater is stopped after a predetermined time elapses. Subsequently, the operation of the second heater is initiated ($S_i$). Subsequently, the operation of the second heater is stopped, and the operation of the first heater is again executed (M). The operation of the first heater is stopped after a predetermined time elapses. At this time, the operation of the second heater is again executed until the water in the second washing tub is heated to the second predetermined temperature ($S_f$). Thereafter, the operation of the first heater is again executed until the water in the first washing tub is heated to the first predetermined temperature ($M_f$).

The operation modes Q8 to Q14 are carried out when the first laundry treating device starts to operate while the second laundry treating device is already in operation. These operating modes are similar to the operation modes Q1 to Q7, respectively, however, they are reverse to each other in terms of the operation order of the first and second laundry treating devices, namely, the order of M and S.

In the operation modes Q1 to Q3 and Q8 to Q10, the heating procedure includes an intermediate heating step for operating the heater included in the laundry treating device which starts to operate during the operation of the other laundry treating device. The intermediate heating step may be step $S_{if}$ in the operation mode Q1, and step $S_i$ in the operation mode Q2 or Q3. Also, the intermediate heating step may be step $M_{if}$ in the operation mode Q8, and step $M_i$ in the operation mode Q9 or Q10. Also, the heating procedure may include an additional heating step for again executing the operation of the heater included in the other laundry treating device after the finish of the intermediate heating step. Here, the additional heating step may be step $M_f$ in the operation mode Q1, step M in the operation mode Q2, and step $M_f$ in the operation mode Q3. Also, the additional heating step may be step $S_f$ in the operation mode Q8, step S in the operation mode Q9, and step $S_f$ in the operation mode Q10. Also, as in the operation mode Q2 or Q3 and the operation mode Q9 or Q10, the first and second heaters may operate alternately until the temperature of water supplied to one of the washing tubs reaches a predetermined temperature.

In the operation modes Q4 to Q7 and the operation modes Q11 to Q14, the heating procedure may include a continuous heating step for continuously operating the heater included in the laundry treating device which was already in operation, and an intermediate heating step for executing the operation of the heater included in the laundry treating device which starts to operate. Here, the continuous heating step may be step $M_f$ in the operation mode Q4, and step M in each of the operation modes Q5 to Q7. The intermediate heating step may be step $S_{if}$ in the operation mode Q4 or Q5, and step $S_i$ in the operation mode Q6 or Q7.

The continuous heating step and the intermediate heating step may be alternately executed until the temperature of water supplied to one of the washing tubs reaches a predetermined temperature. Of course, the intermediate heating step may be executed after, through the continuous heating step, the temperature of water supplied to the associated washing tub is heated to a predetermined temperature.

When one of the first and second heaters operates, the other heater may not operate.

Although the laundry treating device control methods have been described in conjunction with procedures for operating the heaters respectively included in two laundry treating devices, a very similar control scheme could be used to control more than two laundry treating devices.

Figure 5:
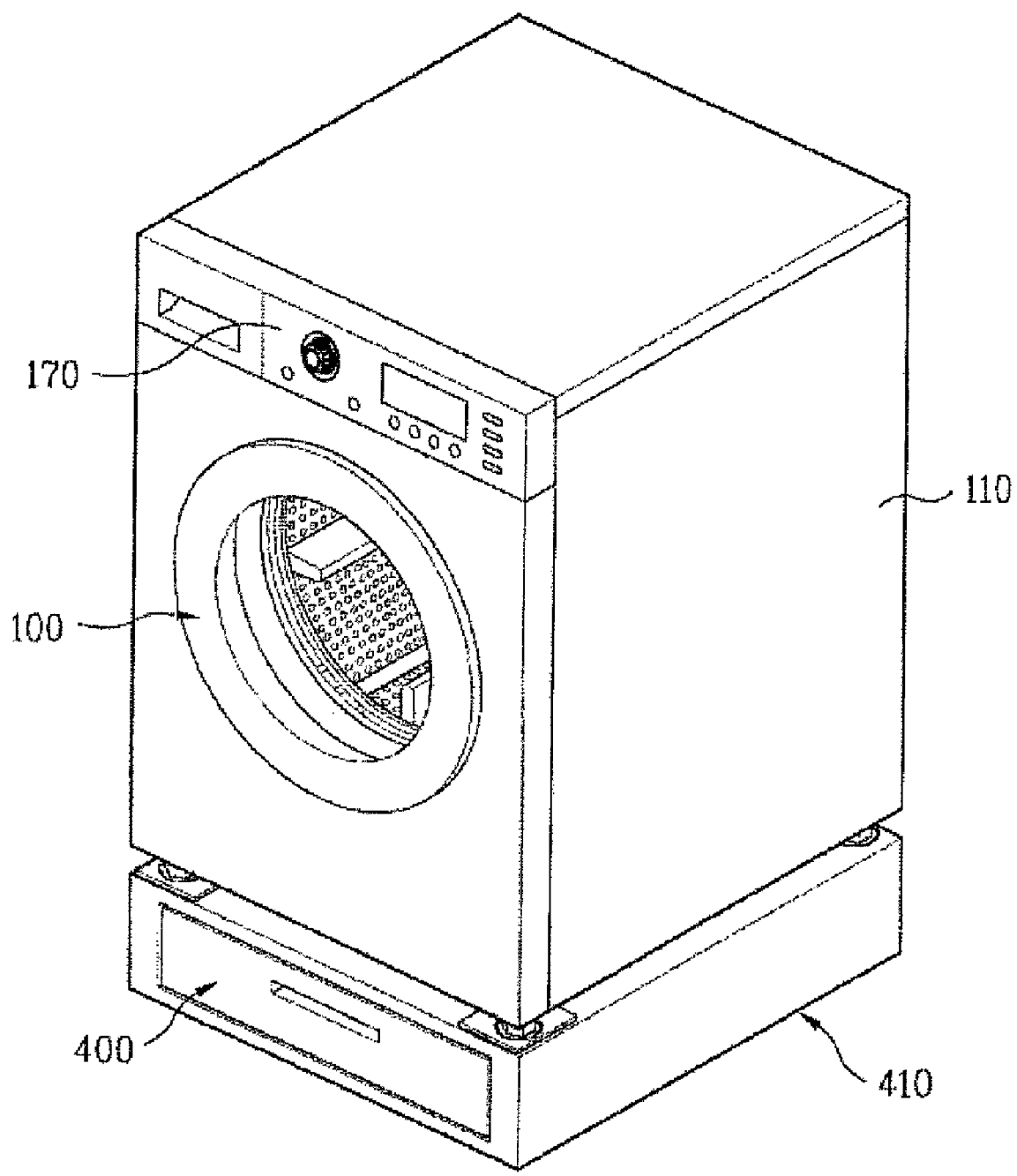
FIG. 5 is a perspective view illustrating another embodiment of a laundry treating device.

FIG. 5 illustrates another embodiment of a laundry treating device. Different from the previous embodiment, in the laundry treating device according to this embodiment, the first laundry treating device 100 is installed in a first cabinet, whereas the second laundry treating device, which is designated by reference numeral 400 in FIG. 5, is installed in a second cabinet 410 forming a space independent of the first cabinet 110. The control panel 170, which controls both the first and second laundry treating devices, may be arranged at the front side of the first cabinet 110.

The procedure for supplying water to the first washing tub (not shown) included in the first laundry treating device 100 and the second washing tub (not shown) included in the second laundry treating device 400 is substantially identical to the above-described laundry treating device control method.

A laundry treating device and control methods as described above provide the following effects.

First, there is an advantage in that it is possible to simultaneously wash different kinds of laundry required to be independently washed, by simultaneously operating the first and second laundry treating devices, which operate independently.

Second, there is an advantage in that it is possible to secure cleanliness while reducing the consumption of electricity by selectively using different laundry treating devices in accordance with the amount and kind of laundry.

Third, there is an advantage in that it is possible to more efficiently and safely control the laundry treating devices by controlling the heaters respectively installed in the laundry treating devices in accordance with the laundry treating condition. For example, there is an advantage in that it is possible to prevent heaters installed in two or more washing tubs from being overloaded by selectively driving the heaters, and thus to safely use the laundry treating device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although numerous embodiments have been described, it should be understood that numerous other modifications and embodiments can be devised by those skilled in the art that will fall within the spirit and scope of the principles of this disclosure. More particularly, variations and modifications are possible in the component parts and/or arrangements which would fall within the scope of the disclosure, the drawings and the appended claims. In addition to variations and modifications in the component parts and/or arrangements, alternative uses will also be apparent to those skilled in the art.

What is claimed is:

1. A method of controlling both a first laundry treating device having a first heater and an adjacent second laundry treating device having a second heater, comprising:
    operating the first heater of the first laundry treating device; and
    operating the second heater of the second laundry treating device, comprising first operating one of the first heater or the second heater, and then operating the other of the first heater or the second heater after operation of the one of the first heater or the second heater is terminated, wherein operating the first heater corn rises continuously operating the first heater until water in the first laundry treating device reaches a predetermined temperature and then stopping operation of the first heater, and wherein operating the second heater comprises operating the second heater after stopping operation of the first heater.

2. The method of claim 1, further comprising receiving information on operation of the first laundry treating device and the second laundry treating device before the first heater and the second heater are operated.

3. The method of claim 1, further comprising, when one of the first or second laundry treating devices is operating, receiving information on operation of the other of the first or second laundry treating devices.

4. The method of claim 1, further comprising determining an order for operating the first heater and operating the second heater based on a predetermined algorithm.

5. The method of claim 1, further comprising stopping operation of the first heater and initiating operation of the second heater when a user requests that the second laundry treating device begin to operate while the first heater is already in operation.

6. The method of claim 1, wherein, when a user requests that the second laundry treating device begin to operate while the first heater is being operated, operating the first heater comprises operating the first heater continuously until a temperature of water in the first laundry treating device reaches a predetermined temperature and then stopping operation of the first heater, and initiating operation of the second heater after stopping operation of the first heater.

7. The method of claim 1, further comprising:
    conducting a first washing operation in the first laundry treating device; and
    conducting a second washing operation in the second laundry treating device, wherein the steps of operating the first heater and operating the second heater are performed while conducting the first and second washing operations to ensure that respective washing steps of the first and second washing operations are performed with washing water having a temperature within a respective predetermined range.

8. A method of controlling both a first laundry treating device having a first heater and an adjacent second laundry treating device having a second heater, comprising:
    operating the first heater of the first laundry treating device;
    operating the second heater of the second laundry treating device, comprising first operating one of the first heater or the second heater, and then operating the other of the first heater or the second heater after operation of the one of the first heater or the second heater is terminated; and
    stopping operation of the first heater and initiating operation of the second heater when a user requests that the second laundry treating device begin to operate while the first heater is already in operation, wherein operating the second heater comprises operating the second heater continuously until a temperature of water in the second laundry treating device reaches a predetermined temperature and then stopping operation of the second heater, and resuming operation of the first heater after stopping operation of the second heater.

9. A method of controlling a first laundry treating device having a first heater and an second laundry treating device having a second heater, the second laundry treating device being positioned adjacent to but segregated from the first laundry treating device, and the first and second laundry treating devices being independently operable, the method comprising:
    operating the first heater to heat washing fluid received in the first laundry treating device until at least one predetermined first condition is satisfied; and
    operating the second heater after stopping operation of the first heater to heat washing fluid received in the second laundry treating device until at least one predetermined second condition is satisfied, wherein operating the first heater until at least one predetermined first condition is satisfied comprises:
        operating the first heater until a temperature of the washing fluid received in the first laundry treating device is greater than or equal to a first predetermined temperature;

stopping operation of the first heater when the temperature of the washing fluid received in the first laundry treating device is greater than or equal to the first predetermined temperature; and initiating operation of the second heater only after stopping operation of the first heater.

10. The method of claim 9, wherein operating the second heater until at least one predetermined second condition is satisfied comprises:

operating the second heater until a temperature of the washing fluid received in the second laundry treating device is greater than or equal to a second predetermined temperature;

stopping operation of the second heater when the temperature of the washing fluid received in the second laundry treating device is greater than or equal to the second predetermined temperature; and resuming operation of the first heater upon stopping operation of the second heater.

11. The method of claim 9, wherein operating the first heater until at least one predetermined first condition is satisfied comprises:

operating the first heater until receiving a command for initiating operation of the second laundry treating device while the first laundry treating device is operating;

stopping operation of the first heater upon receiving the command for initiating operation of the second laundry treating device; and initiating operation of the second heater upon stopping operation of the first heater.

12. The method of claim 11, further comprising operating the second heater until the at least one predetermined second condition is satisfied;

stopping operation of the second heater; and resuming operation of the first heater upon stopping operation of the second heater.

* * * * *